Aug. 30, 1955 E. F. WUNDERLICH 2,716,320
COTTON PICKER SPINDLE
Filed March 29, 1954
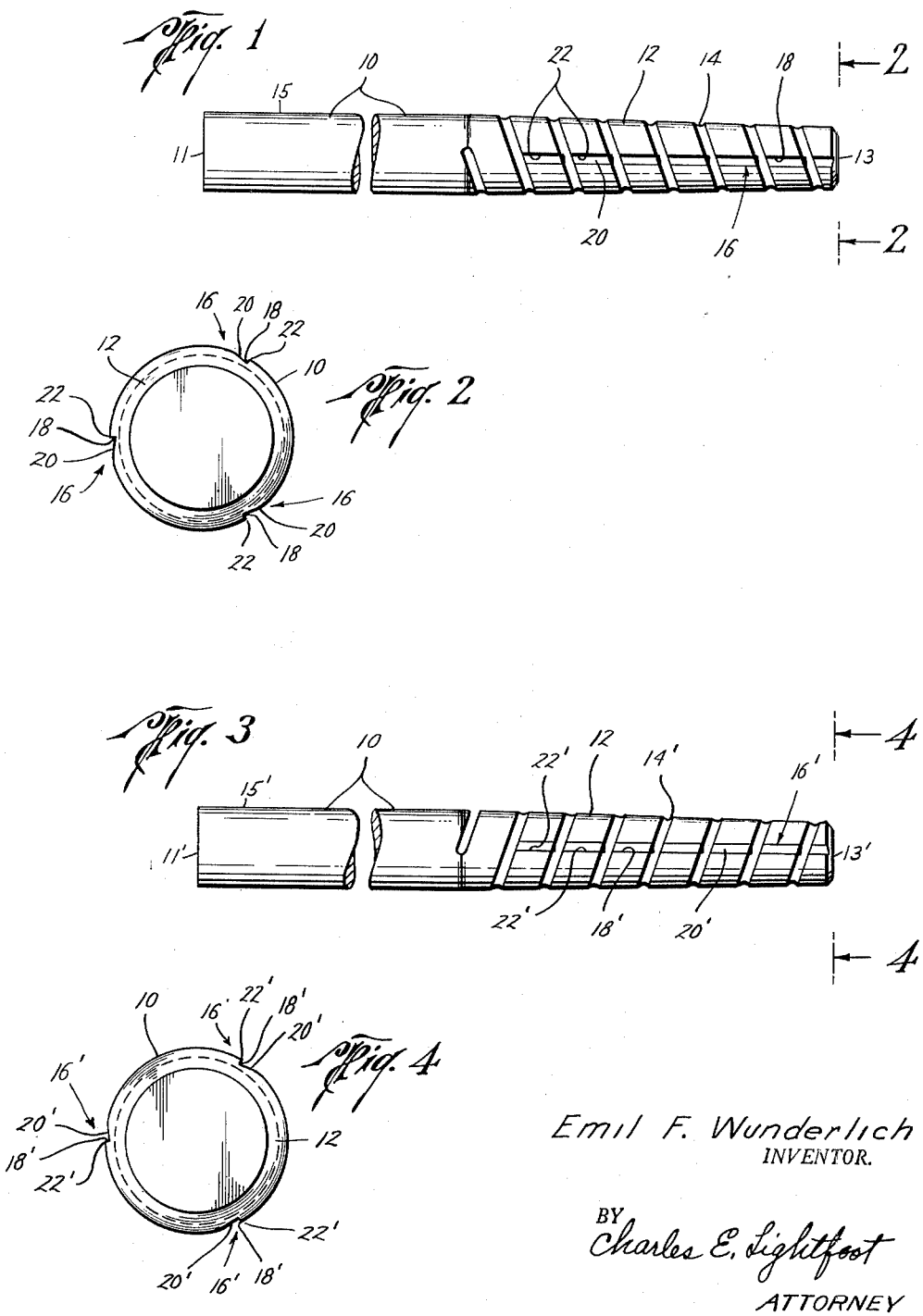
Emil F. Wunderlich
INVENTOR.
BY
Charles E. Lightfoot
ATTORNEY

United States Patent Office 2,716,320
Patented Aug. 30, 1955

2,716,320

COTTON PICKER SPINDLE

Emil F. Wunderlich, Houston, Tex.

Application March 29, 1954, Serial No. 419,167

3 Claims. (Cl. 56—50)

This invention relates to cotton harvesting machinery, and more particularly to a cotton picker spindle or finger of improved construction for use in cotton picking machines.

Cotton picking machines, as heretofore commonly constructed, are provided with picker spindles or fingers which are carried on endless chain mechanism and adapted to be rotated while being moved along into contact with the cotton to pick the cotton from the plants as the machine moves over same. Such spindles or fingers are usually arranged to rotate in one direction while being moved forwardly of the machine on the endless chain mechanism and to rotate in the opposite direction while being moved rearwardly, and means is also provided for removing the cotton from the spindles during the rearward movement of the same. Picker spindles or fingers of this type are commonly formed with barbs, teeth, or the like, which engage the cotton as the machine moves along to pull the cotton from the plants, and as heretofore designed and used are subject to the disadvantage that the fibers of the cotton are torn and broken by the barbs, which also often remove the bolls and leaves, or other parts of the plants, along with the cotton, thus making it necessary to clean the cotton before it can be ginned, which results in lowering the grade of the cotton.

The use of spindles with barbs constructed in this manner makes it necessary to provide stripper mechanism to remove the cotton from the spindles and because of the twisting or winding of the cotton on the spindles during the picking operation and the fact that the cotton is stripped from the spindles without untwisting the same, the cotton is obtained in an undesirable, tightly twisted condition.

The use of spindles having barbs, teeth, or other projecting portions is also accompanied by great danger to the operator, whose clothing may come into contact with the same, and numerous injuries have resulted from persons being caught on such spindles while attempting to clear the machine, while the machine is in operation, upon clogging of the picker mechanism due to failure of the cotton to leave the spindles.

The present invention has for its chief object the provision of a cotton picker spindle of improved construction, by which the above disadvantages are overcome, and which has no barbs, teeth, or other portions projecting beyond the outer surface of the spindle.

Another object of the invention is to provide a cotton picker spindle which is constructed to readily catch the cotton and remove the same from the plant, without causing injury to immature or unripened bolls, or otherwise damaging the plants, or removing leaves or other parts of the plant, which could become mixed with the cotton and result in degrading same.

A further object of the invention is the provision of an improved cotton picker spindle without barbs which is adapted to catch in the cotton when the spindle is rotated in one direction to remove the cotton from the plants, and which is designed to readily release the cotton upon rotation of the spindle in the opposite direction, so that no stripping mechanism is necessary.

Another object of the invention is to provide a cotton picker spindle without barbs having a tapered working portion provided with an external, helical, doffing groove extending throughout the length of the tapered portion and also having one or more circumferentially spaced longitudinal furrows intersecting the helical doffing groove and forming longitudinally extending edge portions positioned for engagement with the cotton upon rotation of the spindle in one direction to engage and pull the cotton from the plant and to release the cotton upon rotation in the other direction.

A further object of the invention is the provision of a cotton picker spindle without barbs which is designed to be rotated in contact with the cotton to wind the cotton on the spindle to pick the cotton, and which is rotatable after the cotton has been removed from the plant in a manner to doff the cotton so that long staple cotton may be thus obtained in a relatively straight and untwisted condition.

A still further obejct of the invention is the provision of a cotton picker spindle without barbs of simple design and rugged construction, which is easily and economically manufactured and which is capable of withstanding the extreme conditions of hard usage and exposure to which such devices are customarily subjected.

The above and other important objects and advantages of the invention will best be understood from the following detailed description, constituting a specification of the same, when considered in conjunction with the annexed drawings, wherein—

Figure 1 is a side elevational view, on an enlarged scale, illustrating a preferred form of the invention, and showing a cotton picker spindle designed for right hand rotation to accomplish the picking of the cotton, and for left hand rotation to release the cotton from the spindle;

Figure 2 is an end elevational view, looking along line 2—2 at the right hand end of the invention as illustrated in Figure 1, and on a scale somewhat larger than that of Figure 1;

Figure 3 is a view similar to that of Figure 1, showing a cotton picker spindle designed for left hand rotation to engage and pick the cotton during the picking operation, and for right hand rotation to doff the cotton from the spindle; and Figure 4 is an end elevational view similar to that of Figure 2, looking along line 4—4 at the right hand end of the spindle illustrated in Figure 3.

Referring now to the drawings in greater detail, the spindles of the invention are provided in two different forms, which are substantially identical in construction, except that one form is adapted for right hand rotation during the picking operation, while the other form is adapted for left hand rotation during such operation. In both forms of the device the spindle comprises a shaft 10 of suitable diameter and length, and formed of suitable material, such as steel or the like, possessing the requisite physical properties of hardness and durability for the purpose, and having a bearing end 11 and a free end 13, the shaft also being formed with a substantially cylindrical bearing portion 15 at its bearing end and a tapering cotton picking portion 12 which tapers from the bearing portion toward the free end of the shaft. The spindles are adapted to be attached to cotton picker mechanism of conventional design, with their tapering ends free and positioned for rotation to engage and pick the cotton from the cotton plant as the picking machine is moved along.

The right hand rotatable spindle, as illustrated in

Figures 1 and 2, is provided with an external helical or spiral doffing groove 14, extending throughout the length of the tapered portion 12, and has one or more longitudinally extending furrows 16, intersecting the helical doffing groove 12, and which are formed with radial wall portions 18, and other wall portions 20 arranged at an angle to the wall portions 18, the wall portions 20 merging with the outer surface of the tapered portion 12 without forming therewith any sharply defined edge. The radially extending wall portions 18 intersect the surface of the tapered portion 12, in edge portions 22, positioned to engage the cotton as the spindle is rotated in engagement therewith, whereby the cotton is caught on the spindle and pulled off of the plant as the machine moves along.

The furrows 16 are preferably very shallow, having a depth of only a few thousandths of an inch with rounded bottoms, and the helical groove 14 is preferably of somewhat greater depth than the depth of the furrows.

The left hand rotatable form of the spindle illustrated in Figures 3 and 4 is substantially identical in construction with the right hand rotatable form of the same, except that the edge portions 22' formed by the intersection of the radially extending wall portions 18' with the surface of the tapering portion of the spindle are positioned for engagement with the cotton upon left hand rotation of the spindle, to catch and pull the cotton from the plant.

In the operation of the spindles, constructed as described above, it will be apparent that the fibers of the cotton will be caught by the edge portions 22 and 22' upon rotation of the spindles as the machine moves along, to twist the cotton and pull the same from the plant, and upon reversal of the direction of rotation of the spindles, after the picking operation has taken place, the cotton will be unwound from the spindles and released therefrom in a relatively straight and untwisted condition, without the necessity for the provision of any means for stripping the cotton from the spindles. The helical doffing groove of the right hand rotatable spindle is in the form of a right hand thread, and that of the left hand rotatable spindle is in the form of a left hand thread. By this construction the doffing grooves act to wind up the cotton on the spindles when the spindles are rotated in a direction to pick the cotton, and function to release or unscrew from the cotton when the spindles are reversely rotated.

Due to the shallowness of the helical doffing grooves and the longitudinal furrows of the spindles, the edge portions 22 and 22' are so located that they are incapable of catching on other parts of the cotton plant, such as the bolls, leaves, or stems of the same, so that the plants are not damaged in any way by contact with the spindles, while at the same time the fibers of the cotton are effectively caught and picked from the plant. Moreover, the spindles formed in the manner described above present a relatively smooth external surface, which will not catch in the clothing of the person operating the machine and will not become caught on foreign articles or substances, such as wire, with which the spindles may come in contact during the picking operation, so that there is danger of damage to the machine resulting from the spindles engaging and picking up wire or other objects likely to be encountered in the cotton fields.

It will thus be seen that the invention provides a cotton picker spindle of improved design, which may be easily and cheaply manufactured, and by the use of which the cotton may be effectively picked without any danger of injury to the plant or to the operator of the machine, and removed from the spindles automatically, without the use of elaborate stripping mechanism.

While the invention has been disclosed herein in connection with a certain specific embodiment of the same, it will be understood that this is intended by way of illustration only, and that various changes can be made in the construction of the device, as well as the particular arrangement of the doffing groove and longitudinal furrows, without departing from the spirit of the invention or the scope of the appended claims.

Having thus clearly shown and described the invention, what is claimed as new and desired to secure by Letters Patent, is—

1. A barbless cotton picker spindle comprising a shaft of generally circular cross-section having a bearing end and a free end, said shaft having a substantially cylindrical bearing portion at its bearing end and a picking portion which tapers from said bearing portion toward said free end said picking portion being formed with a helical doffing groove and a longitudinally disposed furrow intersecting the groove, the remainder of the peripheral surface of said picking portion being smooth, said furrow being defined by a radial wall extending inwardly of said peripheral surface and facing in the direction of rotation of the shaft, said wall forming with said surface longitudinally extending edge portions and a bottom wall merging in a smooth surface with said peripheral surface.

2. A barbless cotton picker spindle comprising a shaft of generally circular cross-section having a bearing end and a free end, said shaft having a substantially cylindrical bearing portion at its bearing end and a picking portion which tapers from said bearing portion toward said free end said picking portion being formed with a helical doffing groove and a longitudinally extending furrow of substantially less depth than said groove intersecting the groove, the remainder of the peripheral surface of said picking portion being smooth, said furrow being defined by a wall extending substantially radially inwardly of said peripheral surface and facing in the direction of rotation of the shaft, said wall forming with said surface longitudinally spaced edge portions and a bottom wall which merges in a smooth surface with said peripheral surface.

3. A barbless cotton picker spindle comprising a shaft of generally circular cross-section having a bearing end and a free end, said shaft having a substantially cylindrical bearing portion at its bearing end and a picking portion which tapers from said bearing portion toward said free end, said picking portion being formed with a plurality of circumferentially-spaced longitudinal furrows each having a wall facing in the direction of rotation of the shaft and extending substantially radially inwardly of said peripheral surface to form with said surface longitudinally extending edges and a bottom wall merging in a smooth surface with said peripheral surface, and said picking portion also having a helical doffing groove intersecting said furrows and dividing said radial wall of each furrow to form longitudinally spaced radial wall portions.

References Cited in the file of this patent

UNITED STATES PATENTS

| Number | Name | Date |
|---|---|---|
| 159,109 | Miller | Jan. 26, 1875 |
| 936,236 | Coburn | Oct. 5, 1909 |
| 976,132 | Miles | Nov. 15, 1910 |
| 1,059,478 | Lispenard | Apr. 22, 1913 |
| 1,134,158 | Pruser | Apr. 6, 1915 |
| 1,229,599 | Fisher | June 12, 1917 |
| 1,245,246 | Lightfoot | Nov. 6, 1917 |
| 1,543,089 | Bardwell et al. | June 23, 1925 |
| 1,646,594 | Phelps et al. | Oct. 25, 1927 |
| 1,780,497 | Miller et al. | Nov. 4, 1930 |
| 2,292,945 | Johnston et al. | Aug. 11, 1942 |
| 2,302,180 | Brown | Nov. 17, 1942 |